UNITED STATES PATENT OFFICE.

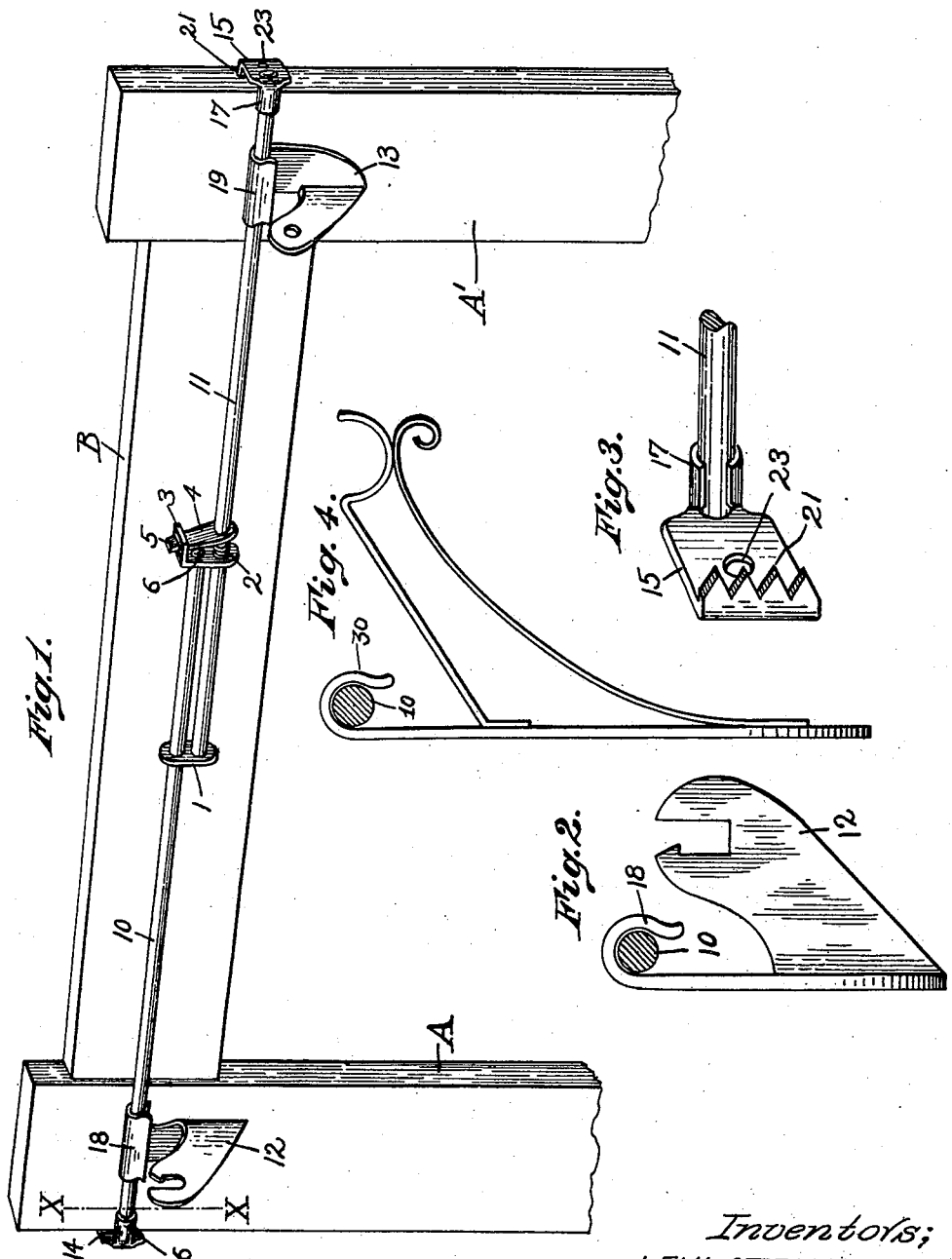

LEVI STRICKLER AND CHARLES H. FISK, OF RICHMOND, INDIANA.

WINDOW-CURTAIN FIXTURE.

SPECIFICATION forming part of Letters Patent No. 710,377, dated September 30, 1902.

Application filed February 7, 1902. Serial No. 92,988. (No model.)

*To all whom it may concern:*

Be it known that we, LEVI STRICKLER and CHARLES H. FISK, citizens of the United States, residing at Richmond, in the county of Wayne and State of Indiana, (whose post-office address is Richmond, Indiana,) have invented and produced new and useful Improvements in Window-Curtain Fixtures; and we do declare the following to be a full, clear, and exact description of our invention, such as will enable others skilled in the art to which it appertains to make and use the same, reference being had to the accompanying drawings, and to the figures and letters of reference marked thereon, which form a part of this specification.

Our invention relates to an improved mechanism to be attached to window-casings without the use of screws, nails, or the like, which consists, essentially, of two parallel oppositely-disposed rods provided on each of their outer ends with a member provided with teeth which are adapted to grasp the opposite outer edges of a window-casing, and an automatic clamping and securing mechanism for the purpose of holding said teeth tightly in engagement with the window-casing.

The objects of our invention are, first, the provision of a curtain-fixture adapted to be secured in its place in contact with window-casings without the use of screws, nails, or the like; second, to provide a curtain-fixture which can be quickly and easily attached in place and as quickly and easily removed therefrom; third, to provide a curtain-fixture which is adjustable for attachment to various widths of windows, and, fourth, to provide a window-curtain fixture neat and attractive in appearance, positive in its action, strong and durable in its construction, and which can be manufactured and sold at a very low price.

Other objects and advantages will appear from the following specification and the drawings.

We attain these objects by the mechanism illustrated in the drawings which form a part of this specification.

Referring now to the drawings, Figure 1 is a perspective view of our window-curtain fixture applied to a window-casing. Fig. 2 is a detail view of the end of one of the brackets, showing one of the rods in section, and taken on line X X of Fig. 1. Fig. 3 is a detail perspective view of one of the clamping members, showing a portion of the rod to which it is attached; and Fig. 4 is a detail view of a curtain-pole bracket, showing the manner of attaching the same to our device and showing a portion of one of the rods to which it is attached.

Similar letters and figures refer to like parts throughout the several views.

A and A' represent the two perpendicular portions of a window-casing, and B represents the horizontal or cross portion of same, and these are shown in the drawings simply to illustrate the manner of attaching our invention thereto.

10 and 11 represent two parallel rods which are slidably attached together at their inner portions by the mechanism which will hereinafter be explained. To the outer ends of each 10 and 11 are permanently secured a toothed clamping member, (shown in Fig. 3,) which is made from one piece of material bent and formed substantially as shown, and is composed of the socket portions 16 and 17, in which the outer ends of the rods 10 and 11 can be securely fastened by clamping the socket portions 16 and 17 tightly around the outer ends of the respective rods 10 and 11, or the outer ends of the rods 10 and 11 may be soldered or brazed into the socket portions 16 and 17, respectively. The flat plate portions 14 and 15 extend rearward at right angles therefrom, and the teeth 20 and 21 (20 not being visible in the drawings) extend in at right angles to 14 and 15, respectively, as shown in Fig. 3. Each of the parts 14 and 15 is provided with a small hole, as 23, Fig. 3, through which a nail or screw may be inserted, if desired, to more permanently attach these parts to the window-casing.

12 and 13 represent the two brackets for supporting the window-shade roller and are provided with overlapping hanger portions 18 and 19, which secure them to the rods 10 and 11 and yet allow them to be attached and detached therefrom quickly and easily.

We provide a pair of curtain-pole brackets to be hooked on the rods 10 and 11 near the outer ends of the latter, formed substantially as shown in Fig. 4, the overlapping hanger portions 30 being integral parts of the respective curtain-pole brackets and are of substantially the same form as the portions 18 and 19, and the curtain-pole brackets are to be slidably attached to the rods 10 and 11 in same manner as the shade-roller brackets 12 and 13.

1 represents a plate provided with two holes, the rod 10 being adapted to slide through one hole and the inner end of the rod 11 being secured in the other hole, substantially as shown.

6 represents a plate similar to plate 1, except that the upper portion is longer and is bent to the right at right angles to 6 to form the portion 3, which is provided with a slot in which the part 5 operates. The plate 6 is provided with two holes corresponding to those in plate 1. The rod 11 is adapted to slide through one hole, and the inner end of rod 10 is secured in the other.

4 represents a plate provided with a hole in which the rod 11 is adapted to operate and is slightly larger than the holes in plates 1 and 6. The upper part of 4 terminates in the part 5, which fits in the slot 3.

2 represents a coil-spring around the rod 11 between 6 and 4 and is adapted to keep these parts separated.

It is apparent that the toothed clamping members can be brought toward each other, the rods 11 passing through holes in 6 and 4, and the rod 10 passing through a hole in plate 1. It is also apparent that if the toothed clamping members be moved away from each other the plate 4 will lock on the rod 11 and the said parts cannot be moved apart without pressing 4 parallel with 6. It can now be seen that our device can be attached to various widths of windows and that the shade-brackets and curtain-pole brackets can be placed any desired distance apart and will be held securely in place between the window-casing and the rods 10 and 11.

Our invention is perfectly adapted to accomplish the results for which it is intended, and it is evident that changes in and modifications of the construction herein shown and described may be made and that analogous parts may be used to accomplish the same results without departing from the spirit of our invention or sacrificing any of its many advantages.

The specific construction of the details of our invention in which the novel features are embodied may be variously changed without altering the essential principles which are claimed as new.

We wish it distinctly understood that we do not dedicate any part of our invention to the public and that we wish adequate and just protection for every feature of the invention herein shown and described that is new and useful and which involves invention.

Having now fully shown and described our invention and the best mode for its construction and use to us known at this time, what we claim as new, and desire to secure by Letters Patent of the United States, is—

1. In a window-curtain fixture in combination with a pair of rods slidably attached together and adapted to move endwise parallel with each other and a mechanism for locking said rods against an outward movement, of a clamping member, formed of one piece of material, attached securely to the outer end of each rod, said clamping member consisting of a flat portion at right angles to the rods, with a hole through the center thereof, a front portion bent at right angles to said flat portion and adapted to nearly surround and tightly grip the ends of the rods, and, a rear portion extending in at right angles to said flat portion and provided with teeth for engaging the window-casing, all substantially as shown and described.

2. In a window-curtain fixture in combination with a pair of rods 10 and 11 with clamping members attached to the outer ends of each and means for locking together their inner ends of a pair of window-shade brackets and a pair of curtain-pole brackets provided with inwardly-projecting hooks on their upper portions adapted to hook over the rods 10 and 11 at any points along their lengths, all substantially as shown and described and for the purposes set forth.

In testimony whereof we have signed our names to this specification in the presence of two subscribing witnesses.

LEVI STRICKLER.
CHARLES H. FISK.

Witnesses:
R. W. RANDLE,
R. E. RANDLE.